US009754036B1

(12) United States Patent
Gabrilovich et al.

(10) Patent No.: US 9,754,036 B1
(45) Date of Patent: Sep. 5, 2017

(54) ADAPTING THIRD PARTY APPLICATIONS

(71) Applicant: Google Inc., Mountain View, CA (US)

(72) Inventors: Evgeniy Gabrilovich, Sunnyvale, CA (US); John Giannandrea, Saratoga, CA (US); Jason Douglas, San Francisco, CA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 14/226,027

(22) Filed: Mar. 26, 2014

Related U.S. Application Data (60) Provisional application No. 61/920,249, filed on Dec. 23, 2013.

(51) Int. Cl.
  *G06F 17/30* (2006.01)
  *G06Q 30/02* (2012.01)

(52) U.S. Cl.
  CPC ... *G06F 17/30867* (2013.01); *G06Q 30/0256* (2013.01)

(58) Field of Classification Search
  CPC .................................................. G06F 17/30867
  See application file for complete search history.

(56) References Cited

U.S. PATENT DOCUMENTS

| | | | | |
|---|---|---|---|---|
| 6,345,289 B1 * | 2/2002 | Lotspiech | ............. | G06Q 30/02 705/26.5 |
| 7,822,620 B2 * | 10/2010 | Dixon | .................... | G06Q 30/02 705/1.1 |
| 7,827,055 B1 * | 11/2010 | Snodgrass | .............. | G06Q 30/02 705/14.73 |
| 8,583,448 B1 * | 11/2013 | Harrison, Jr. | ..... | G06F 17/30867 705/1.1 |
| 2005/0131762 A1 * | 6/2005 | Bharat | ................... | G06Q 10/00 705/14.66 |
| 2005/0222989 A1 * | 10/2005 | Haveliwala | ............ | G06Q 30/02 |
| 2006/0112079 A1 * | 5/2006 | Holt | .................. | G06F 17/30867 |
| 2008/0097982 A1 * | 4/2008 | Gupta | ............... | G06F 17/30864 |
| 2010/0082660 A1 * | 4/2010 | Muilenburg | ...... | G06F 17/30702 707/768 |

FOREIGN PATENT DOCUMENTS

| | | |
|---|---|---|
| WO | WO0041090 A1 | 7/2000 |
| WO | WO2011014682 A2 | 2/2011 |

* cited by examiner

*Primary Examiner* — Robert Beausoliel, Jr.
*Assistant Examiner* — Arthur Ganger
(74) *Attorney, Agent, or Firm* — Fish & Richardson P.C.

(57) ABSTRACT

Methods, systems, and apparatus, including computer programs encoded on a computer storage medium, for a search engine to provide an entity some indication of topics in which a user may have an interest. The methods, systems, and apparatus include actions of receiving information at a search engine from a classifier indicating that a user is likely interested in a set of topics based on information about the user provided by the search engine to the classifier. Additional actions may include selecting a subset of the topics and generating a search results page that includes one or more references for one or more resources that are responsive to a search query. At least one reference of the one or more references may include information based on the received information that indicates that the user is likely interested in the subset of topics.

19 Claims, 3 Drawing Sheets

ADAPTING THIRD PARTY APPLICATIONS

CROSS-REFERENCE TO RELATED APPLICATIONS

This application claims the benefit of U.S. Provisional Patent Application No. 61/920,249, filed Dec. 23, 2013, the entirety of which is hereby incorporated by reference as if fully set forth therein.

TECHNICAL FIELD

This disclosure generally relates to search engines, and one particular implementation relates to providing certain information to a web site that hosts a resource that is selected by a user, from among the resources that are identified on a search results page.

BACKGROUND

Search engines may receive a search query from a user and may, in response, provide a search results page to the user that identifies search results that are relevant to the search query. Each search result can include, for example, titles, text snippets, images, links, reviews, or other information relating to a resource that is referenced by the search result.

SUMMARY

In general, an aspect of the subject matter described in this specification may involve a process for a search engine to provide, to an entity that is associated with a selected hyperlink in a search results page, an indication of a topic or topics in which a user may have an interest. The entity may then select or adjust a resource based on the topics in which the user may have an interest, to enhance the user's experience with the entity.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of a user cannot be determined. Thus, the user may have control over how information is collected about him or her and used by a content server.

To provide the indication, the search engine may first receive topic information that indicates that the user is classified as having interest in the topics, e.g. from a classifier. The classifier may classify that the user has an interest in the topics based on user information regarding the user. For example, if the search engine has access to user information regarding a user's previous search queries and previous selections of search results, this user information may be provided to the classifier. Using this user information, the classifier may make classifications as to whether the user is likely interested in various topics and generate topic information based on the classification. The search engine may then receive topic information from the classifier that indicates the user is classified as having interest in the various topics. Topics may include, for example, favorite types of restaurants, pet animals, or movie genres.

In a particular example, the classifier indicates that the user is likely interested in the topic "THAI RESTAURANTS" if the user has included the term "THAI FOOD" in multiple search queries, or selected multiple hyperlinks for webpages that the search engine has associated with the topic "THAI RESTAURANTS." The search engine may then receive topic information from the classifier that indicates that the user is likely interested in the topic "THAI RESTAURANTS."

The search engine may then generate a search results page that includes hyperlinks for webpages that are responsive to the search query and, based on the topic information received from the classifier, may encode information in the hyperlinks that enables the entities associated with the webpages to receive information indicating topics in which the user is likely interested. For example, the search engine may encode information that indicates that the user is classified as being likely interested in the topic "THAI RESTAURANTS" in a hyperlink for a webpage of an entity that provides online restaurant reservation services.

In another example, the search engine may encode information in the hyperlink that indicates that the user is classified as being likely interested in the topic "THAI RESTAURANTS" by encoding a unique identifier for a user in the hyperlink. The entity may then receive the unique identifier and request information regarding topics that the user is classified as being likely interested in from the search engine using the unique identifier.

The entity may then dynamically adapt a user's experience with the entity based on the topics that the user is likely interested in. For example, if the search engine provides information to the entity so that the entity is able to determine that the user is classified as being likely interested in the topic, "THAI RESTAURANTS," the entity may prioritize displaying restaurants that serve Thai food to the user.

Generally, the search engine may only provide information, about the user to an entity, for which the entity has committed to use in a responsible manner. Additionally, in some implementations, the search engine may also reduce the amount of information about the user that is provided to the entity based on an indication from the entity as to whether the entity utilized the information that indicates that the user is likely interested in the topic. Based on determining whether the entity utilized the information, the search engine may decide to continue providing the same information or different information to the entity. For example, if the search engine determines that the entity that provides online reservation services did not request the information, or adjust a user's experience based on the information, indicating that the user is classified as being interested in the topic "ROMANTIC COMEDY MOVIES," the server may determine not to continue providing information to the entity indicating that the user is classified as being likely interested in the topic.

The search engine may also receive information relating to a user's interaction with the entity that may impact a classification by the classifier regarding whether the user is likely interested in the topic. The search engine may update the user information that is provided to the classifier based on the received information relating to the user's interaction with the entity. For example, the search engine may receive information from the entity that indicates that the user made a reservation at a Mexican restaurant. Accordingly, the search engine may provide the additional information from the entity to the classifier so that in the future, the classifier may classify that the user is not likely interested in the topic "THAI RESTAURANTS" but is likely interested in the topic "MEXICAN RESTAURANTS."

In some aspects, the subject matter described in this specification may be embodied in methods that may include the actions of receiving information at a search engine from a classifier indicating that a user is likely interested in a set of topics based on information about the user provided by the search engine to the classifier. Additional actions may include selecting a subset of the topics and generating a search results page that includes one or more references for one or more resources that are responsive to a search query. At least one reference of the one or more references may include information based on the received information that indicates that the user is likely interested in the subset of topics.

In some aspects, the subject matter described in this specification may be embodied in method that may include the actions of receiving information indicating that a user is likely interested in a set of topics based on information about the user. Additional actions may include selecting a subset of the topics and generating a search results page that includes one or more references for one or more resources. At least one reference of the one or more references may include information based on the received information that indicates that the user is likely interested in the subset of topics.

Other versions include corresponding systems, apparatus, and computer programs, configured to perform the actions of the methods, encoded on computer storage devices.

These and other versions may each optionally include one or more of the following features. For instance, in some implementations the received information may indicate a likelihood, for each topic of the set of topics, that the user is interested in the topic. The information included in the at least one reference may include information indicating the likelihood, for each topic of the subset of the topics, that the user is interested in the topic.

In some aspects, selecting a subset of the topics may include selecting the subset of the topics based at least on the search query.

In certain aspects, selecting a subset of the topics may include identifying the one or more resources that are responsive to the search query and selecting the subset of the topics based at least on the resource for the at least one reference.

In some implementations, actions may include determining, based on an indication from an entity associated with the selected reference, whether the entity utilized the information that enables the entity to determine that the user is likely interested in a topic of the subset of topics and providing information that enables the entity to determine that the user is likely interested in the topic of the subset of topics based on determining whether the entity associated with the selected reference utilized the information that enables the entity to determine that the user is likely interested in the topic of the subset of topics.

In some aspects, actions may include receiving information relating to a user's interaction with the resource and updating the user information based on the information. The information relating to the user's interaction with the resource may include information indicating one or more of a linger time, a user selection, a query term entered by the user, or a transaction completed by the user. Actions may also include providing the updated user information to the classifier and receiving information at the search engine from the classifier indicating that the user is likely interested in a different set of topics based on the updated user information.

In certain aspects, generating a search results page that includes one or more references for one or more resources that are responsive to a search query may include determining that the resource referenced by the at least one reference satisfies one or more trust requirements and, based on determining that the resource referenced by the at least one reference satisfies the one or more trust requirements, providing the information based on the received information that indicates that the user is likely interested in the subset of topics in the at least one reference.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
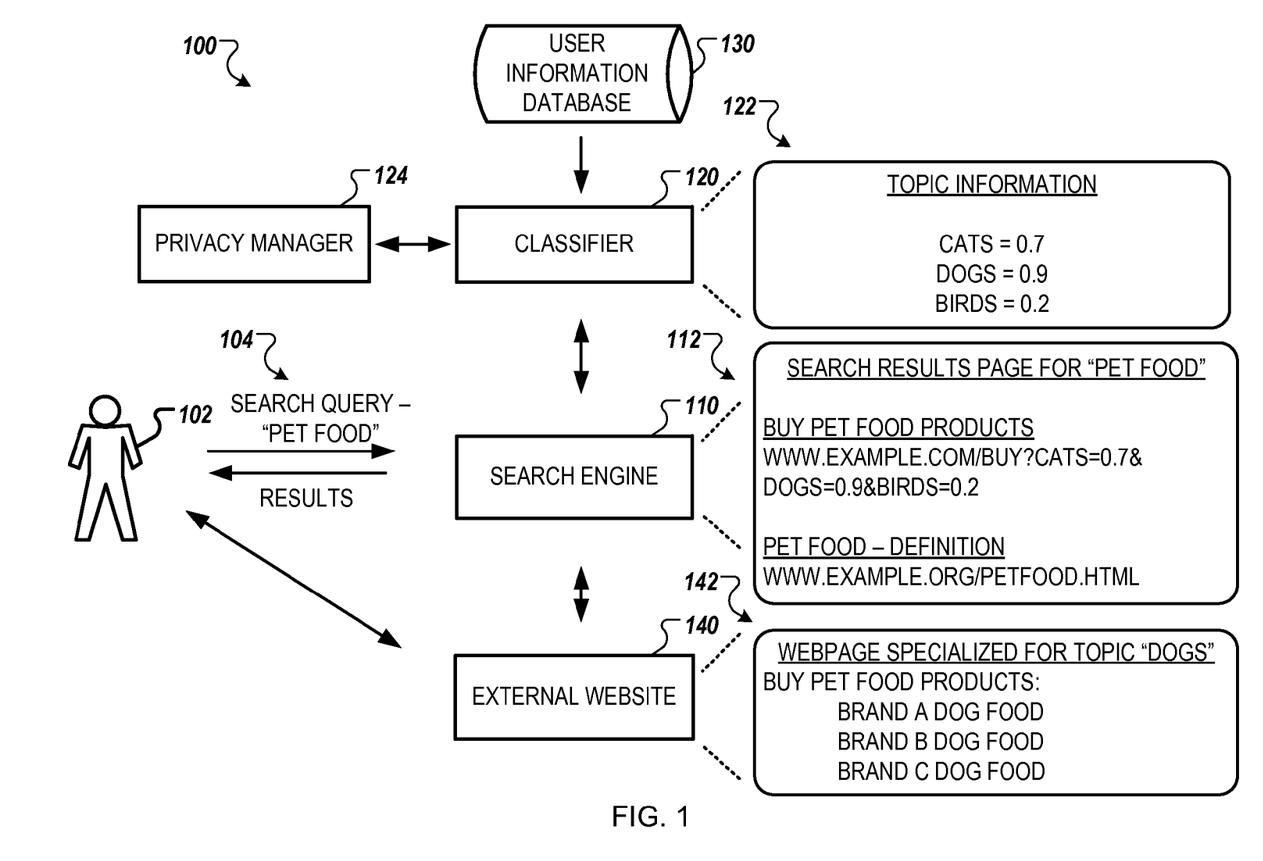
FIG. 1 is a block diagram of an example system for a search engine that may provide an entity, associated with a selected hyperlink in a search results page, some indication of topics in which a user is likely interested.

FIG. 1 is a block diagram of an example system 100 for a search engine 110 that may provide an entity, associated with a selected hyperlink in a search results page, some indication of topics in which a user 102 may have an interest. Generally, the system 100 may include the search engine 110, a classifier 120, a privacy manager 124, and a user information database 130.

The search engine 110 may provide the user 102 a search results page 112 in response to a search query 104 from the user 102. For example, if the user 102 provides a search query 104 "PET FOOD," the search engine 110 may identify resources, e.g., webpages, documents, or media, that are responsive to the search query 104 "PET FOOD," and generate references, e.g., hyperlinks, to the identified resources. Additionally, the search engine 110 may provide an external website 140, e.g., an entity, associated with an identified resource some indication of topics in which the user 102 is likely interested so that the external website may adjust a user experience for the user 102 based on the likely interests of the user 102.

For example, the search engine 110 may receive a search query 104 of "PET FOOD" from the user 102. The search engine 110 may identify webpages that are associated with "PET FOOD" and also obtain topic information from the classifier 120 that indicates that the user 102 is classified as having interests in the topic "CATS" of "0.7," the topic "DOGS" of "0.9," and the topic "BIRDS" of "0.2," where "0.7," "0.9," and "0.2" may be on a scale of 0 to 1.0, where 0 may indicate a strong likelihood of disinterest and 1.0 may indicate a strong likelihood of interest. The topic information may represent the likelihood of interest in topics of a topic ontology. The topic ontology may include potential topics for which the classifier 120 may classify the likelihood of interest of users.

The search engine 110 may generate a search results page 112 that includes references to the identified webpages, and based on the topic information 122, include information in the references that indicates that the user 102 has an interest in the topic "CATS" of "0.7," an interest in the topic "DOGS" of "0.9," and an interest in the topic "BIRDS" of "0.2." In generating the search results page 112, the search engine 110 may encode information that indicates to the external website 140 that the user 102 has an interest in the topics. For example, the search engine 110 may generate a hyperlink of "www.example.com/buy? cats=0.7& dogs=0.9&birds=0.2" for a webpage that is responsive to the search query where "cats=0.7& dogs=0.9&birds=0.2" in the generated hyperlink may encode that the user 102 is classified as having an interest in the topic "CATS" of "0.7," an interest in the topic "DOGS" of "0.9," and an interest in the topic "BIRDS" of "0.2." In another example, the search engine 110 may generate a hyperlink of "www.example.com/buy? usertype=542" for the webpage where "usertype=542" in the generated hyperlink may encode that the user 102 is classified as having a type of "542," which may be a type of user that the external website 140 associates with users that likely have an interest in dogs and likely have a disinterest in birds.

In generating the search results page 112, the search engine 110 may encode information in the hyperlink that is a unique identifier for a user. The search engine 110 may generate a hyperlink of "www.example.com/buy?userid=537180" to a webpage that is responsive to the search query, where "userid=537180" in the generated hyperlink may be a unique identifier for the user.

When the external website 140 is accessed using the hyperlink, the external website 140 may determine the external website 140 is being accessed and provide the unique identifier to the search engine 110. The search engine 110 may then provide the external website 140 information that indicates what topics the user is likely interested. For example, if the external website 140 is accessed with a hyperlink that includes "userid=537180," the external website 140 may provide "userid=537180" to the search engine 110 and receive information indicating that the user is classified as having an interest in the topic "CATS" of "0.7," an interest in the topic "DOGS" of "0.9," and an interest in the topic "BIRDS" of "0.2."

The unique identifier for the user may be unique in the context of the particular search results and topic information, but could not be used by the external website 140 to trace back to the identity of a particular individual or reconstruct all topics that a particular user is likely interested. For example, the external website 140 may not know the identity of the user that has the "userid=537180" and may only obtain information about the user that the search engine 110 provides to the external website 140 in response to receiving "userid=537180" to the external website 140. The next time the search engine 110 generates a hyperlink to the same external website 140 for the same user, the search engine 110 may use a different unique identifier, e.g., "userid=891258," for the user so that the external website 140 may not be able to determine that the unique identifiers "userid=537180" and "userid=891258" are for the same user. The unique identifier for the user may be an identifier that is temporary and may be unique for each external website 140. For example, if a search results page 112 includes references to eight different external websites, the search engine 110 may generate eight different unique identifiers, and include the different unique identifiers in the corresponding references to the different external websites, e.g., a first unique identifier in a first reference, a second unique identifier in a second reference, etc.

In some implementations, the search engine 110 may determine what information to provide to the external website 140 based on the search query 104. The search engine 110 may provide the external website 140 information that corresponds to topics that are identified as being relevant to the search query 104. For example, the search engine 110 may receive the search query "MOVIES" and obtain topic information indicating the user 102 is interested in "DOGS," "CATS," "BIRDS, "THAI FOOD," "JAPANESE FOOD," "ROMANTIC COMEDIES," THRILLERS," AND "SKYDIVING." The search engine 110 may determine that for the search query "MOVIES," only the topics of "ROMANTIC COMEDIES" and "THRILLERS" correspond to topics that are identified as being relevant to the search query "MOVIES." Accordingly, the search engine 110 may only provide information for the topics "ROMANTIC COMEDIES" and "THRILLERS" to external websites that are accessed through hyperlinks in the search results page responsive to the search query "MOVIES."

In some implementations, the search engine 110 may determine what information to provide to the external website 140 based on topics for which the external website 140 has indicated that the external website 140 will adapt a user experience. The external website 140 may provide the indication to the search engine 110 before the search engine 110 receives the search query 104 from the user 102. For example, the website for a restaurant reservation service may indicate to the search engine 110 that the website is only interested in information regarding types of cuisines that users have an interest. Accordingly, from the topic information indicating that the user 102 is interested in "DOGS," "CATS," "BIRDS, "THAI FOOD," "JAPANESE FOOD," "ROMANTIC COMEDIES," THRILLERS," AND "SKYDIVING," the search engine 110 may only provide information for the topics "THAI FOOD" and "JAPANESE FOOD" to the website for the restaurant reservation service.

In some implementations, the search engine 110 may determine that the external website 140 can be trusted before providing information indicating topics in which users are likely interested. For example, the search engine 110 may determine that the external website 140 satisfies one or more trust requirements before encoding information, from which the external website 140 may determine topics in which a user is likely interested, in the reference to the external website 140.

The search engine 110 may obtain the topic information 122 from the classifier 120. The classifier 120 may make classifications as to whether the user 102 is likely interested in various topics. For example, the classifier 120 may make a classification as to whether the user 102 is likely interested in the topics "CATS," "DOGS," and "BIRDS." The classifier 120 may make the classification based on user information about the user 102. User information may include, among other information, previous search queries made by the user 102, previous selections made by the user 102 of references in search results pages 112, information related to a social network of the user 102, or information describing past purchases made by the user 102. For example, the classifier 120 may determine that the user information indicates that the user 102 frequently searches for information about dogs and owns a dog. Accordingly, the classifier may classify that the user has an interest of "0.9," a high likelihood of interest, in the topic "DOGS." In another example, the classifier 120 may determine that the user information indicates that the user 102 rarely views information about cats. Accordingly, the classifier 120 may classify that the user 102 has an interest of "0.7," a moderately high likelihood of interest, in the topic "CATS."

The classifier 120 may interact with the privacy manager 124. The privacy manager 124 may ensure that the user 102 has authorized the classification of the user based on the user information. For example, the privacy manager 124 may prevent the classifier 120 from obtaining user information or providing a classification to the search engine 110 if the user 102 has not authorized the search engine 110 to provide information indicating topics in which the user is likely interested to an external website 140. The privacy manager 124 may filter user information before it goes to the classifier 120 or filters topic information from the classifier 120. For example, the privacy manager 124 may filter user information or topic information that the user has not indicated may be used. The privacy manager 124 may select topics for the ontology that are unlikely to invoke privacy concerns. For example, the privacy manager 124 may select topics for the ontology based on manual selections of topics by an administrator, or feedback from users as to what type of topics the users may be willing or not willing to share.

The classifier 120 may obtain the user information from a user information database 130. The user information database 130 may store information about users. For example, the user information database 130 may store user information for multiple users where each user is associated with a particular set of user information. The user information database 130 may receive an identification of a user 102 from the classifier 120, determine the set user information that is associated with the user 102 based on the identification of the user 102, and provide the set user information to the classifier 120.

The classifier 120 may make the classifications as to whether the user 102 is likely interested in various topics based on machine-learning. For example, the classifier 120 may be trained in advance using training data that includes user information for various users and indications that the users are interested in particular topics. The classifier 120 may include a neural network that is trained so that when the neural network receives the user information for a particular user from the training data, output from the neural network indicates that the particular user is likely interested in topics that the training data indicates the user is interested in. The classifier 120 may then use the now trained neural network to make the classifications as to whether the user 102 is likely interested in various topics The external website 140 that is referenced by the search results page 112 provided by the search engine 110 may be a website that adapts a user's experience based on the topics that the user is likely interested. For example, if the external website 140 is accessed with a reference that links to a webpage for selling pet food and the reference encodes that the user 102 is likely interested in the topic "DOGS," the external website 140 may determine that the user 102 is likely interested in the topic "DOGS" based on the reference and provide the user 102 a webpage 142 that is specialized for the topic "DOGS." In the example, the webpage 142 specialized for the topic "DOGS" may list pet food available for sale with dog food near the top of the list.

In some implementations, the search engine 110 may optionally determine whether the external website 140 utilized the information that indicates that the user 102 is likely interested in a topic. For example, if the user 102 does not navigate to a webpage on the external website 140 that utilizes the information regarding topics that may be of interest to the user 102, the external website 140 may provide information to the search engine 110 that indicates that the external website 140 did not utilize the information that indicates that the user 102 is likely interested in the topics. In another example, if the user 102 does navigate to a webpage on the external website 140 that utilizes the information regarding topics that may be of interest to the user 102, the external website 140 may provide information to the search engine 110 that indicates that the external website 140 utilized the information that indicates that the user 102 is likely interested in the topics.

Based on determining whether the external website 140 utilized the information, the search engine 110 may decide to continue providing the same information or different information to the external website. For example, if the search engine 110 determines that the external website 140 did not use information indicating that the user is interested in the topic "DOGS," the search engine 110 may determine not to continue providing information to the external website 140 that indicates that the user is likely interested in the topic "DOGS." If the search engine 110 determines that the external website 140 did use information indicating that the user is likely interested in the topic "DOGS," the search engine 110 may determine to continue providing information to the external website 140 that indicates that the user is likely interested in the topic "DOGS." The search engine 110 may also store information regarding whether the external website 140 utilized the information in the user information database 130 so that in the future the classifier 120 may classify the user 102 based on the stored information.

The search engine 110 may also receive information relating to a user's interaction with the external website 140 that may impact a classification by the classifier 120 regarding whether the user 102 is likely interested in a topic. For example, the external website 140 may provide the search engine 110 information regarding user activities, e.g., selections, purchases, dwell time, navigation history, on the external website 140. The search engine 110 may update the user information that is provided to the classifier 120 based on the received information relating to a user's interaction with the external website 140 so that the classifier 120 may classify the user 102 based on the additional information. For example, the search engine 110 may receive information from the external website 140 that indicates that the user 102 bought bird food and update the user information stored in the user information database 130 to reflect that the user 102 bought bird food so that the next time the classifier 120 makes a classification for the user 102, the classifier 120 may classify that the user may likely be less interested in the topic "DOGS" but may likely be more interested in the topic "BIRDS."

Different configurations of the system 100 may be used where functionality of the search engine 110, classifier 120, user information database 130, and external website 140 may be combined, further separated, distributed, or interchanged. The system 100 may be implemented in a single device or distributed across multiple devices.

Figure 2A:
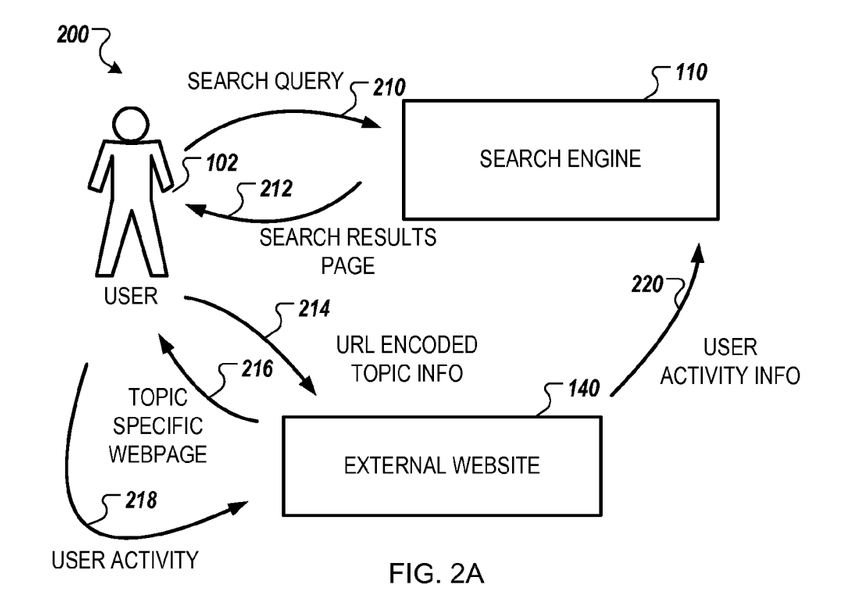
FIGS. 2A & 2B are block diagrams illustrating example flows of information in the system.
Figure 2B:
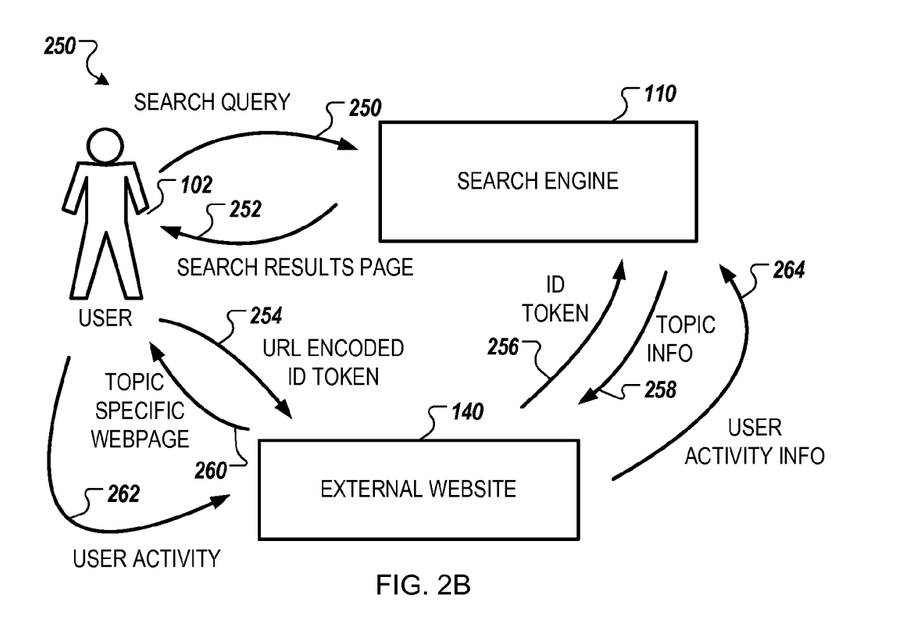

FIGS. 2A & 2B are block diagrams illustrating example flows of information in the system. The following describes the flows 200, 250 in the context of components of the system 100 that are described with reference to FIG. 1. However, the flows 200, 250 may be for other systems or system configurations.

FIG. 2A illustrates the flow 200 of information where the search engine 110 may encode information indicating topics of interest for a user 102 into the references that are provided in the search results page. Initially, the user 102 may submit a search query to the search engine 110 (210). For example, the user 102 may submit the search query "MOVIES."

In response, the search engine 110 may provide the user 102 a search results page that includes a reference to an external website 140 that is responsive to the search query, where the reference includes information that indicates topics of interests for the user (212). For example, in response the search query "MOVIES," the search engine 110 may provide the user 102 a search results page that includes a hyperlink to a website for a movie streaming service where the hyperlink includes the encoding "ROMANTICCOMEDIES=0.9&THRILLERS=0.8&HORROR=0.1." The encoding may indicate the user is likely interested in movies that are romantic comedies and thrillers, but is not likely interested in horror movies.

The user 102 may then select the reference to access the external website 140 and provide the indication to the external website 140 (214). For example, the user 102 may select the hyperlink for the website of the movie streaming service and the website of the movie streaming service may determine from "ROMANTICCOMEDIES=0.9&THRILLERS=0.8&HORROR=0.1" in the hyperlink that the user is likely interested in movies that are romantic comedies and thrillers, but is not likely interested in horror movies.

The external website 140 may then provide the user 102 a webpage that is specific to the topics of interest for the user 102 (216). For example, based on determining that the user is likely interested in the romantic comedies and thrillers, the website for the movie streaming service may provide a webpage for the user to select to watch a movie where initially the movie options that the user may select from are movies that are romantic comedies or thrillers.

The external website 140 may next collect user activity information regarding the activities of the user 102 on the external website 140 and provide the user activity information to the search engine 110 (218, 220). For example, the external website 140 may determine that the user 102 decided to watch a documentary and provide user activity information to the search engine 110 indicating that the user 102 decided to watch a documentary. In the future, the search engine 110 may then classify the user 102 as also likely interested in documentaries based on the user activity information received from the external website 140.

FIG. 2B illustrates the flow 250 of information where the search engine 110 may encode information indicating an identity of a user 102 into the references that are provided in the search results page so that the external website 140 may later receive information regarding topics that may likely be of interest to the user 102 from the search engine 110 based on the information indicating the identity of the user 102. Initially, the user 102 may submit a search query to the search engine 110 (250). For example, the user 102 may submit the search query "MOVIES.".

In response, the search engine 110 may provide the user 102 a search results page that includes a reference to an external website 140 that is responsive to the search query, where the reference includes information that identifies the user (252). For example, in response the search query "MOVIES," the search engine 110 may provide the user 102 a search results page that includes a hyperlink to a website for a movie streaming service where the hyperlink includes an identity token, "USERID=54873" The identity token may indicate an identity of the user.

The user 102 may then select the reference to access the external website 140 and provide the token to the external website 140 (254). For example, the user 102 may select the hyperlink for the website of the movie streaming service and the website of the movie streaming service may determine that the user 102 accessed the website using a hyperlink that includes the token "USERID=54873."

After the user 102 accesses the external website 140 and before providing a webpage to the user 102, the external website 140 may provide the token 256 to the search engine 110 (256). For example, the website of the movie streaming service may provide the token "USERID=54873" to the search engine 110.

After receiving the token from the external website 140, the search engine may provide the external website 140 information indicating the interests of the user 102 (258). For example, in response to receiving the token "USERID=54873" from the website of the movie streaming service, the search engine 110 may provide the website information "ROMANTICCOMEDIES=0.9," "THRILLERS=0.8," and "HORROR=0.1." The information may indicate the user is likely interested in movies that are romantic comedies and thrillers, but is not likely interested in horror movies.

The external website 140 may then provide the user 102 a webpage that is specific to the interests of the user 102 (260). For example, based on the website for the movie streaming service may provide a webpage for the user 102 to select to watch a movie where initially the movie options that the user 102 may select from are movies that are romantic comedies or thrillers.

The external website 140 may next collect user activity information regarding the activities of the user 102 on the external website 140 and provide the user activity information to the search engine 110 (262, 264). For example, the external website 140 may determine that the user 102 decided to watch a documentary and provide user activity information to the search engine 110 indicating that the user 102 decided to watch a documentary. In the future, the search engine 110 may then classify the user 102 as also likely interested in documentaries based on the user activity information received from the external website 140.

Figure 3:
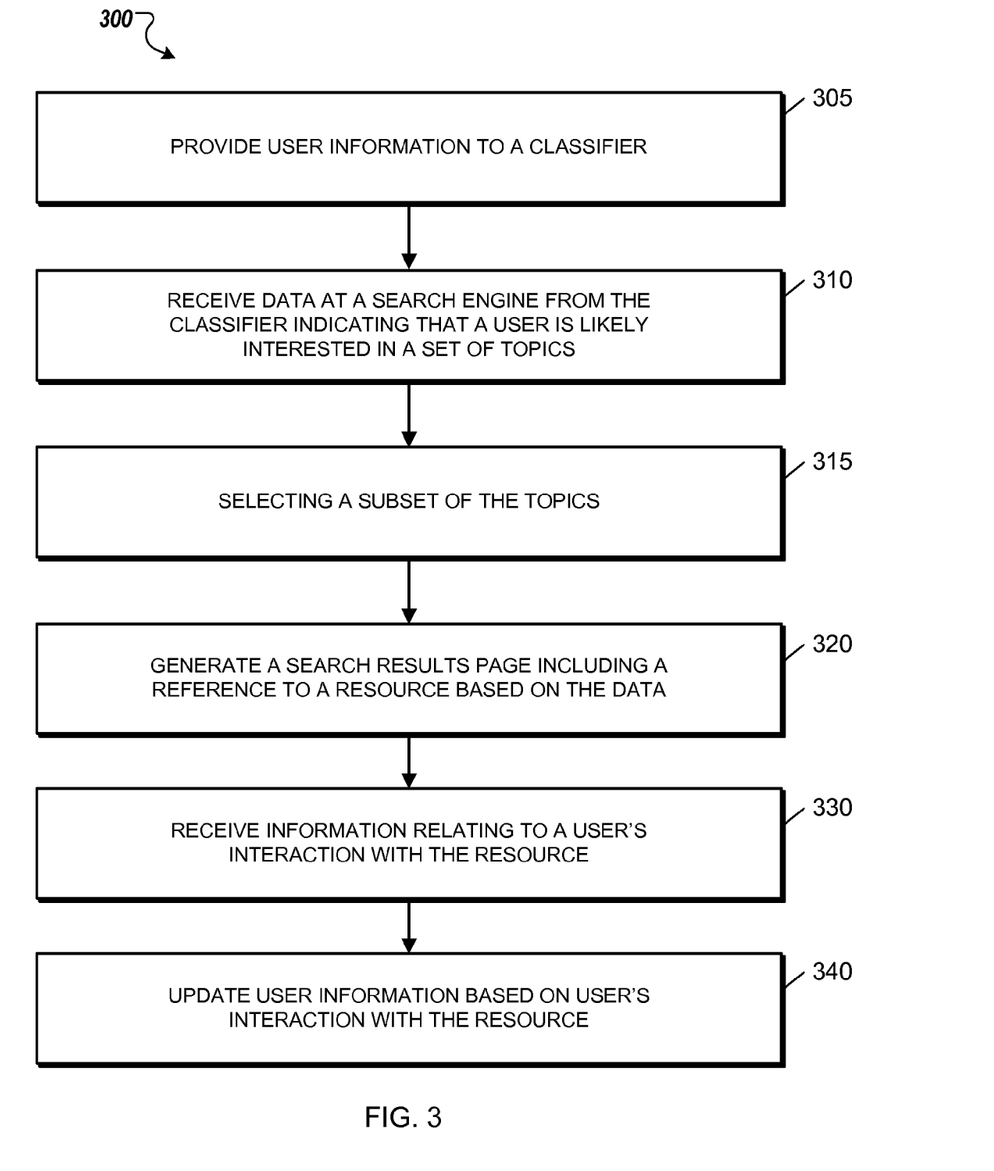
FIG. 3 is a flowchart of an example process for providing an entity some indication of topics in which a user is likely interested.

FIG. 3 is a flowchart of an example process 300 for providing an external website some indication of topics in which a user is likely interested. The following describes the processing 300 as being performed by components of the system 100 that are described with reference to FIG. 1. However, the process 300 may be performed by other systems or system configurations.

The process 300 may include providing user information to a classifier (305). As noted above, the privacy manager 124 may ensure that the user 102 has authorized the classification of the user based on the user information and may filter user information before it goes to the classifier 120 or filter topic information from the classifier 120. The search engine 110 may provide information regarding a user's previous searches and search result page selections to a classifier 120 for the classifier 120 to make a classification of likely topics of interest for the user based on the information.

The process 300 may include receiving information at a search engine indicating that a user is likely interested in a set of topics (310). The search engine may receive the information from the classifier 120. For example, in response to receiving a search query, "RESTAURANTS,"

and providing an identification of the user submitting the search query to a classifier 120, the search engine 110 may receive topic information 122 from the classifier 120 that indicates that the user 102 is likely interested in the set of topics that includes "THAI FOOD," "JAPANESE FOOD," and "ROMANTIC COMEDIES." The classifier 120 may generate the topic information 122 based on user information about the user that may be stored in a user information database 130. For example, the classifier 120 may generate the topic information 122 indicating that the user is likely interested in "THAI FOOD," "JAPANESE FOOD," and "ROMANTIC COMEDIES" based on information stored in the user information database 130 that indicates that the user has previously eaten at, previously reviewed, or previously visited Thai and Japanese restaurants, and has frequently searched for movies that are romantic comedies.

The process may include selecting a subset of the topics (315). For example, from the set of topics, the search engine 110 may determine that for the particular search query of "RESTAURANTS," only the topics of "THAI FOOD" and "JAPANESE FOOD" in the set of topics are relevant. Accordingly, the search engine 110 may select only the two topics of the set, and not select the topic of "ROMANTIC COMEDIES."

The process may include generating a search results page including a reference to a resource based on the information (320). For example, the search engine 110 may determine that a website for making reservations at restaurants is responsive to the search query and generate a search results page 112 that includes a hyperlink to the website for making reservations at restaurants. The search engine 110 may include an indication that the user 102 is likely interested in the subset of the topics, e.g., "THAI FOOD" and "JAPANESE FOOD," in the hyperlink. The indication may specify topics and a level of interest of the user in the topic. For example, the indication may specify for the topic "THAI FOOD" that the user is classified as having an interest of "0.9." Additionally or alternatively, the indication may specify an identity for the user 102 for the website to request information specifying topics and a level of interest of the user in the topics.

The process may include receiving information relating to a user's interaction with the resource (330). The search engine 110 may provide the search results page to the user 102, and the user 102 may select the reference to access the resource. For example, the user 102 may select the hyperlink for the website of the restaurant reservation service and the website of the restaurant reservation service may determine from the hyperlink that the user 102 is likely interested in Thai food and Japanese food. The external website 140 may then provide the user 102 a webpage that is specific to the topics of interest for the user 102. For example, the website for the restaurant reservation service may provide a webpage for the user 102 to make a reservation from restaurants that serve Thai food or Japanese food.

The external website 140 may collect user activity information regarding the activities of the user 102 on the external website 140 and provide the user activity information to the search engine 110. For example, the external website 140 may determine that the user 102 decided to make a reservation at a Mexican restaurant after viewing three Thai food restaurants and provide user activity information to the search engine 110 indicating that the user 102 decided to make a reservation at a Mexican restaurant after viewing three Thai food restaurants.

The process may include updating user information based on the user's interaction with the resource (340). The search engine 110 may update the user information stored in the user information database 130 based on the user activity information received from the external website 140. For example, the search engine 110 may receive user activity information indicating that the user 102 decided to make a reservation at a Mexican restaurant after viewing three Thai food restaurants, and store that information in the user information database 130 so that in the future, the classifier 120 classifies that the user 102 is interested in "THAI FOOD" and is also interested in "MEXICAN FOOD" based on the user activity information received from the external website 140.

The principles described above may be implemented in different ways. For example, in some implementations the system 100 may use alternatives to a search engine 110. The system 100 may use a web server that generates one or more webpages that include references to resources from other web servers. For example, the web server may generate webpages for e-mail services, financial services, or social networking services, where the generated webpages include links to resources provided by other service providers. When generating a web page for a particular user, the web server may similarly provide user information to the classifier 120, receive information from the classifier 120 indicating that the user is likely interested in a set of topics, and generate the webpage so that the references to resources include information that indicates that the user is likely interested in the subset of topics. In some implementations, the system 100 may use alternatives to the classifier 120. For example, the system 100 may user a topic interest ranker that ranks a user's likely interest in topics based on regression analysis on the user information.

In some implementations, the same principles described above may be implemented for mobile devices. For example, a mobile device of a user may obtain information about the user from various sources, e.g., e-mail, text messages, or search queries. When the user invokes an application on the mobile device, the mobile device may provide information about the user to the application. For example, the mobile device may provide information that the user is likely interested in romantic comedies to an application associated with movies. The application may then adjust the user's experience with the application based on the received information. For example, the application may highlight movies that are romantic comedies.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or additionally, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
    receiving, by a search engine and from a classifier, topic information indicating that, based at least on information about a user that was provided by the search engine to the classifier, the user is likely interested in a set of one or more topics;
    receiving, by the search engine, a search query with one or more terms that correspond to a subset of the topics in which the user is likely interested;
    identifying, by the search engine, the subset of the topics in which the user is likely interested that correspond to one or more terms in the search query;
    generating, by the search engine, a search results page that includes a link (i) to a particular resource that the search engine identifies as responsive to the search query, and (ii) that is encoded with topic information for the subset of topics that were indicated to the search engine by the classifier as topics in which the user is likely interested and identified by the search engine as topics that correspond to one or more terms in the search query; and
    providing the search results page for display.

2. The computer-implemented method of claim 1,
    wherein the information about the user that was received by the search engine indicates a likelihood, for each topic of the set of one or more topics, that the user is interested in the topic, and
    wherein the information, encoded with the link, that references the subset of topics that were indicated to the search engine by the classifier as topics in which the user is likely interested indicates the likelihood, for each topic of the subset of the topics, that the user is interested in the topic.

3. The computer-implemented method of claim 1, wherein selecting a subset of the topics that were indicated to the search engine by the classifier as topics in which the user is likely interested comprises:
    identifying the particular resource as responsive to the search query; and
    selecting the subset of the topics based at least on the resource for the at least one reference.

4. The computer-implemented method of claim 1, comprising:
    determining, based on an indication from an entity associated with the particular resource, whether the entity utilizes information that references subsets of topics indicated as topics in which the user is likely interested; and
    providing information references subsets of topics indicated as topics in which the user is likely interested based on determining that the entity utilizes information that references subsets of topics indicated as topics in which the user is likely interested.

5. The computer-implemented method of claim 1, comprising:
    receiving information relating to a user's interaction with the particular resource; and
    updating the information about the user based on the information.

6. The computer-implemented method of claim 5, wherein the information relating to the user's interaction with the resource comprises information indicating one or more of a linger time, a user selection, a query term entered by the user, or a transaction completed by the user.

7. The computer-implemented method of claim 5, comprising:
    providing the updated information about the user to the classifier; and
    receiving information at the search engine from the classifier indicating that the user is likely interested in a different set of topics based on the updated information about the user.

8. The computer-implemented method of claim 1, wherein generating a search results page that includes a link (i) to a particular resource that the search engine identifies as are responsive to the search query comprises:
    determining that the particular resource satisfies one or more trust requirements; and
    based on determining that the particular resource satisfies the one or more trust requirements, providing the information that references the subset of topics that were indicated to the search engine by the classifier as topics in which the user is likely interested.

9. A system comprising:
    one or more computers; and
    one or more storage devices storing instructions that are operable, when executed by the one or more computers, to cause the one or more computers to perform operations comprising:
        receiving, by a search engine and from a classifier, topic information indicating that, based at least on information about a user that was provided by the search engine to the classifier, the user is likely interested in a set of one or more topics;
        receiving, by the search engine, a search query with one or more terms that correspond to a subset of the topics in which the user is likely interested;
        identifying, by the search engine, the subset of the topics in which the user is likely interested that correspond to one or more terms in the search query;
        generating, by the search engine, a search results page that includes a link (i) to a particular resource that the search engine identifies as responsive to the search query, and (ii) that is encoded with topic information for the subset of topics that were indicated to the search engine by the classifier as topics in which the user is likely interested and identified by the search engine as topics that correspond to one or more terms in the search query; and
        providing the search results page for display.

10. The system of claim 9,
    wherein the information about the user that was received by the search engine indicates a likelihood, for each topic of the set of one or more topics, that the user is interested in the topic, and
    wherein the information, encoded with the link, that references the subset of topics that were indicated to the search engine by the classifier as topics in which the user is likely interested indicates the likelihood, for each topic of the subset of the topics, that the user is interested in the topic.

11. The system of claim 9, wherein selecting a subset of the topics that were indicated to the search engine by the classifier as topics in which the user is likely interested comprises:
identifying the particular resource as responsive to the search query; and
selecting the subset of the topics based at least on the resource for the at least one reference.

12. The system of claim 9, comprising:
determining, based on an indication from an entity associated with the particular resource, whether the entity utilizes information that references subsets of topics indicated as topics in which the user is likely interested; and
providing information references subsets of topics indicated as topics in which the user is likely interested based on determining that the entity utilizes information that references subsets of topics indicated as topics in which the user is likely interested.

13. The system of claim 9, the operations comprising:
receiving information relating to a user's interaction with the particular resource; and
updating the information about the user based on the information.

14. The system of claim 13, wherein the information relating to the user's interaction with the resource comprises information indicating one or more of a linger time, a user selection, a query term entered by the user, or a transaction completed by the user.

15. The system of claim 13, the operations comprising:
providing the updated information about the user to the classifier; and
receiving information at the search engine from the classifier indicating that the user is likely interested in a different set of topics based on the updated information about the user.

16. A non-transitory computer-readable medium storing software comprising instructions executable by one or more computers which, upon such execution, cause the one or more computers to perform operations comprising:
receiving, by a search engine and from a classifier, information indicating that, based at least on information about a user that was provided by the search engine to the classifier, the user is likely interested in a set of one or more topics;
receiving, by the search engine, a search query with one or more terms that correspond to a subset of the topics in which the user is likely interested;
identifying, by the search engine, the subset of topics in which the user is likely interested that correspond to one or more terms in the search query;
generating, by the search engine, a search results page that includes a link (i) to a particular resource that the search engine identifies as responsive to the search query, and (ii) that is encoded with topic information for the subset of topics that were indicated to the search engine by the classifier as topics in which the user is likely interested and identified by the search engine as topics that correspond to one or more terms in the search query; and
providing the search results page for display.

17. The medium of claim 16,
wherein the information about the user that was received by the search engine indicates a likelihood, for each topic of the set of one or more topics, that the user is interested in the topic, and
wherein the information, encoded with the link, that references the subset of topics that were indicated to the search engine by the classifier as topics in which the user is likely interested indicates the likelihood, for each topic of the subset of the topics, that the user is interested in the topic.

18. The medium of claim 16, wherein selecting a subset of the topics that were indicated to the search engine by the classifier as topics in which the user is likely interested comprises:
identifying the particular resource as responsive to the search query; and
selecting the subset of the topics based at least on the resource for the at least one reference.

19. The medium of claim 16, the operations comprising:
determining, based on an indication from an entity associated with the particular resource, whether the entity utilizes information that references subsets of topics indicated as topics in which the user is likely interested; and
providing information references subsets of topics indicated as topics in which the user is likely interested based on determining that the entity utilizes information that references subsets of topics indicated as topics in which the user is likely interested.

* * * * *